United States Patent
DiBenedetto

(10) Patent No.: US 9,322,291 B2
(45) Date of Patent: Apr. 26, 2016

(54) ANTI-ICE SUPPLY SYSTEM FOR INLET GUIDE VANES

(71) Applicant: United Technologies Corporation, Hartford, CT (US)

(72) Inventor: Enzo DiBenedetto, Kensington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 811 days.

(21) Appl. No.: 13/714,788

(22) Filed: Dec. 14, 2012

(65) Prior Publication Data

US 2014/0169934 A1    Jun. 19, 2014

(51) Int. Cl.
*F01D 25/02* (2006.01)
*F01D 9/06* (2006.01)
*F02C 7/047* (2006.01)

(52) U.S. Cl.
CPC ............... *F01D 25/02* (2013.01); *F01D 9/065* (2013.01); *F02C 7/047* (2013.01); *F05D 2260/31* (2013.01); *Y10T 29/49321* (2015.01)

(58) Field of Classification Search
CPC ........... F01D 25/10; F01D 9/06; F01D 9/065; F01D 25/02
See application file for complete search history.

(56) References Cited

U.S. PATENT DOCUMENTS

| | | | |
|---|---|---|---|
| 2,718,350 A | 9/1955 | Burgess | |
| 3,123,283 A | 3/1964 | Leis | |
| 4,856,962 A * | 8/1989 | McDow | 415/115 |
| 4,860,534 A | 8/1989 | Easley et al. | |
| 5,029,440 A | 7/1991 | Graber et al. | |
| 5,220,785 A | 6/1993 | Miller | |
| 6,442,944 B1 | 9/2002 | Skur, III | |
| 6,450,763 B1 * | 9/2002 | Crum et al. | 415/160 |
| 7,055,304 B2 | 6/2006 | Courtot et al. | |
| 2003/0035719 A1 | 2/2003 | Wadia et al. | |
| 2010/0232935 A1 | 9/2010 | Twell | |
| 2010/0236213 A1 | 9/2010 | Schilling | |
| 2010/0236215 A1 | 9/2010 | Venkataraman et al. | |

FOREIGN PATENT DOCUMENTS

| | | |
|---|---|---|
| EP | 0357173 | 3/1990 |
| EP | 1207272 A2 | 5/2002 |
| GB | 2152150 A | 7/1985 |

OTHER PUBLICATIONS

International Search Report and Written Opinion for PCT Application PCT/US2013/075001, mailed Sep. 25, 2014.
European Search Report for EP Application No. 13876101.0 dated Dec. 4, 2015.

* cited by examiner

*Primary Examiner* — Richard Edgar
(74) *Attorney, Agent, or Firm* — Carlson, Gaskey & Olds P.C.

(57) ABSTRACT

Disclosed is a gas turbine engine including a plurality of inlet guide vanes. The gas turbine engine further includes an inlet case supporting each of the plurality of inlet guide vanes, and the inlet case is provided with at least one passageway in communication with a source of fluid. The at least one passageway is configured to communicate the fluid to each of the plurality of inlet guide vanes.

20 Claims, 3 Drawing Sheets

SUPPLY OF ANTI-ICE FLUID

ANTI-ICE SUPPLY SYSTEM FOR INLET GUIDE VANES

GOVERNMENT CONTRACT

This invention was made with government support under Contract No. 5148262-0302-0343 awarded by the United States Army. The Government has certain rights in this invention.

BACKGROUND

Gas turbine engines include compressor sections, which typically include inlet guide vanes, or struts, upstream of a series of rotor blades and stator vanes. These inlet guide vanes are often exposed to a relatively cold fluid flowing into the engine. In certain conditions, potentially hazardous ice can form on the inlet guide vanes.

SUMMARY

A gas turbine engine according to one non-limiting embodiment of this disclosure includes a plurality of inlet guide vanes, and an inlet case supporting each of the plurality of inlet guide vanes. The inlet case is provided with at least one passageway in communication with a source of fluid, and the at least one passageway is configured to communicate the fluid to each of the plurality of inlet guide vanes.

In a further non-limiting embodiment of this disclosure, each of the plurality of inlet guide vanes includes an internal passageway.

In a further non-limiting embodiment of this disclosure, the at least one passageway of the inlet case is configured to communicate the fluid to each of the internal passageways of the plurality of inlet guide vanes.

A further non-limiting embodiment of this includes a split case mounted to the inlet case by way of a plurality of fasteners, the inlet case provided with a plurality of recesses for receiving the plurality of fasteners.

In a further non-limiting embodiment of this disclosure, the at least one passageway of the inlet case includes a plurality of angled portions extending from the plurality of recesses toward one of the plurality of inlet guide vanes.

In a further non-limiting embodiment of this disclosure, a space is provided between an end of a respective one of the plurality of recesses and a corresponding end of one of the plurality of fasteners such that a fluid can flow through the plurality of recesses.

In a further non-limiting embodiment of this disclosure, each of the plurality of inlet guide vanes includes a vane stem mounted to the inlet case, and wherein each of the plurality of inlet guide vanes include an axial passageway.

In a further non-limiting embodiment of this disclosure, each of the plurality of inlet guide vanes includes a perpendicular passageway provided in the vane stem thereof, the perpendicular passageway in fluid communication with the axial passageway and the at least one passageway of the inlet case.

In a further non-limiting embodiment of this disclosure, the fluid is an anti-ice fluid.

In a further non-limiting embodiment of this disclosure, the anti-ice fluid is sourced from one of (1) a compressor section of the gas turbine engine, (2) a combustion section of the gas turbine engine, and (3) a turbine section of the gas turbine engine.

A method for supplying inlet guide vanes with fluid according to a non-limiting embodiment of this disclosure includes providing a gas turbine engine including a plurality of inlet guide vanes and an inlet case supporting each of the plurality of inlet guide vanes. The inlet case is provided with at least one passageway. The method further includes providing a flow of fluid to the at least one passageway, and the at least one passageway communicates the flow of fluid to the plurality of inlet guide vanes.

In a further non-limiting embodiment of this disclosure, each of the plurality of inlet guide vanes includes an internal passageway.

In a further non-limiting embodiment of this disclosure, the flow of fluid is provided to each of the internal passageways of the inlet guide vanes.

A method for manufacturing a series of passageways for communicating fluid to inlet guide vanes according to an embodiment of this disclosure includes machining a plurality of angled passageways into an inlet case between a plurality of openings for receiving a stem of an inlet guide vane, and the plurality of recesses for receiving fasteners. The method further includes machining a perpendicular passageway into each of the stems of the plurality of inlet guide vanes. The plurality of inlet guide vanes are mounted relative to inlet case such that the plurality of recesses, the plurality of angled passageways, the perpendicular passageways, and the internal passageways are in fluid communication with one another.

In a further non-limiting embodiment of this disclosure, a space is provided at an end of a respective one of the plurality of recesses and a corresponding end of one of the split case fasteners such that a fluid can flow through the plurality of recesses.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
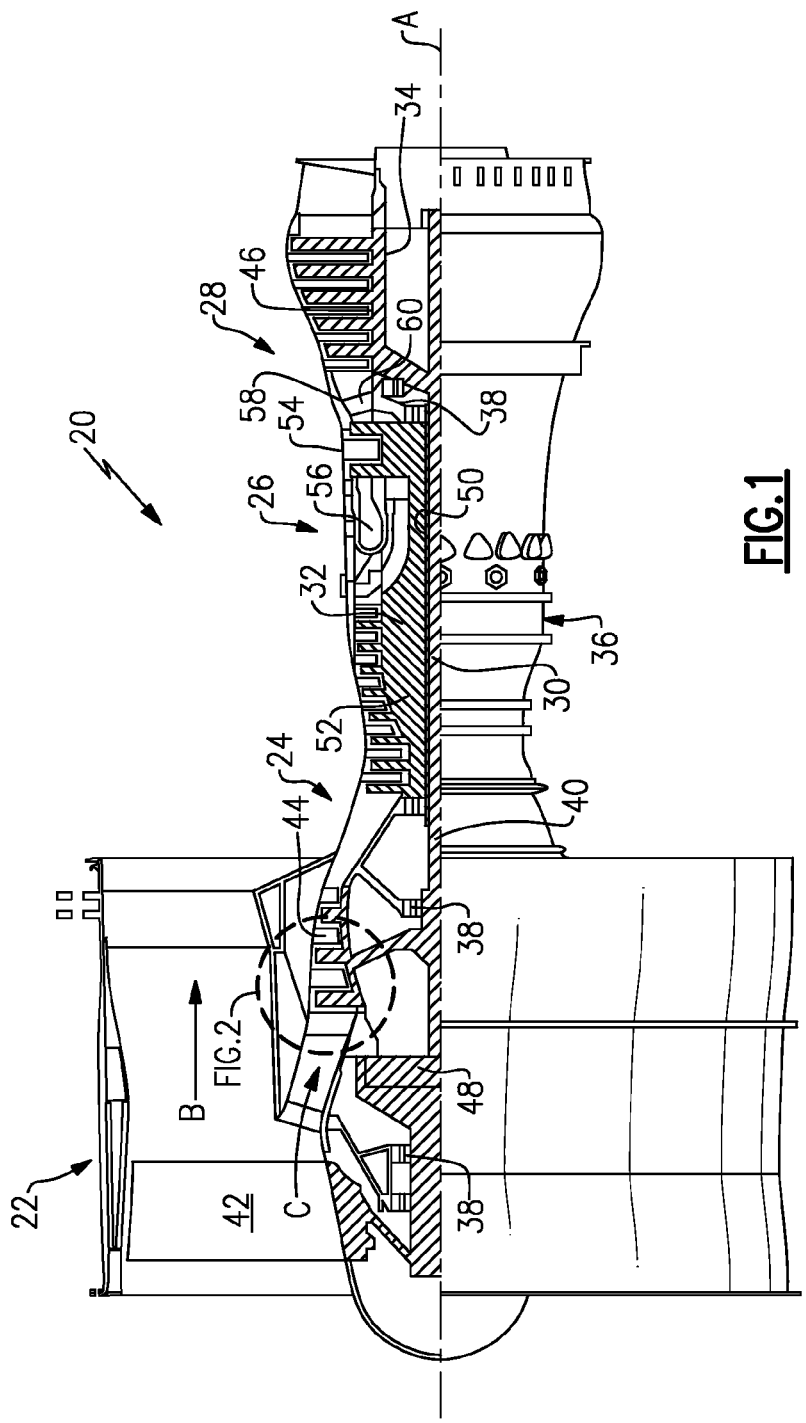
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58.

Figure 2:
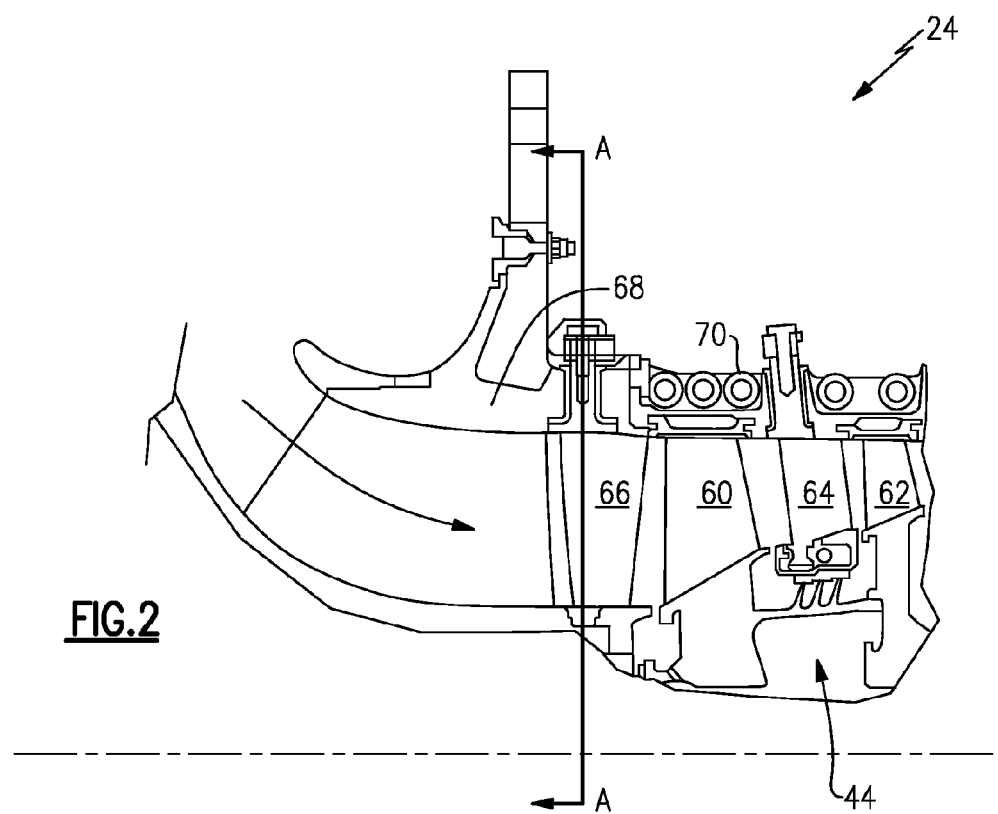
FIG. 2 illustrates the detail of the encircled area in FIG. 1.

FIG. 2 is a view illustrating an example arrangement corresponding to the encircled area in FIG. 1. In particular, FIG. 2 is a partial view of the compressor section 24 of the gas turbine engine 20. As illustrated, the low-pressure compressor 44 includes a plurality of rotor blades 60, 62 and a plurality of stator vanes 64 arranged about the engine central axis A. A plurality of inlet guide vanes 66 are provided upstream of the rotor blades 60, 62 and stator vanes 64. In this example, each of the inlet guide vanes 66 are mounted to an inlet case 68. As used herein, the term "inlet case" refers to a portion of the overall engine casing supporting the inlet guide vanes 66. A split case 70 is mounted relative to the inlet case 68 to guide rotation of the rotor blades 60, 62 and to maintain position of the stator vanes 64.

Figure 3:
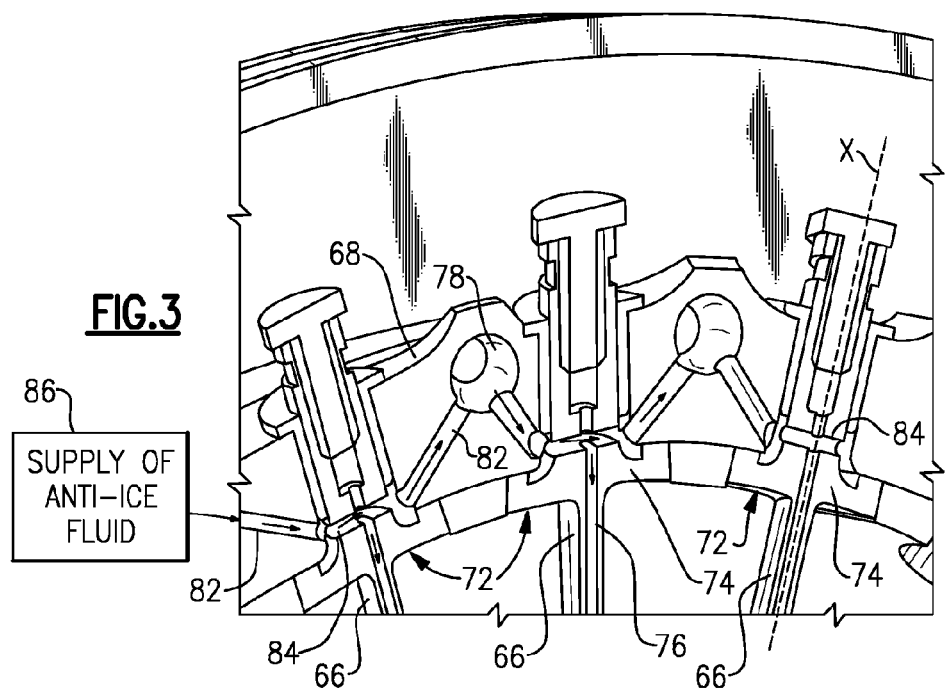
FIG. 3 is a perspective, cross-sectional view taken along line A-A from FIG. 2.

FIG. 3 is a perspective, cross-sectional view taken along line A-A from FIG. 2. As illustrated, the inlet case 68 is provided with a plurality of openings 72 for receiving the stem 74 of each of the inlet guide vanes 66. Each of the guide vanes 66 is arranged such that its axis X extends generally perpendicular to the engine central axis A. In this example, each of the inlet guide vanes 66 includes an axial passageway 76 therein, which extends internally within each inlet guide vane along the axis X thereof.

Figure 4:
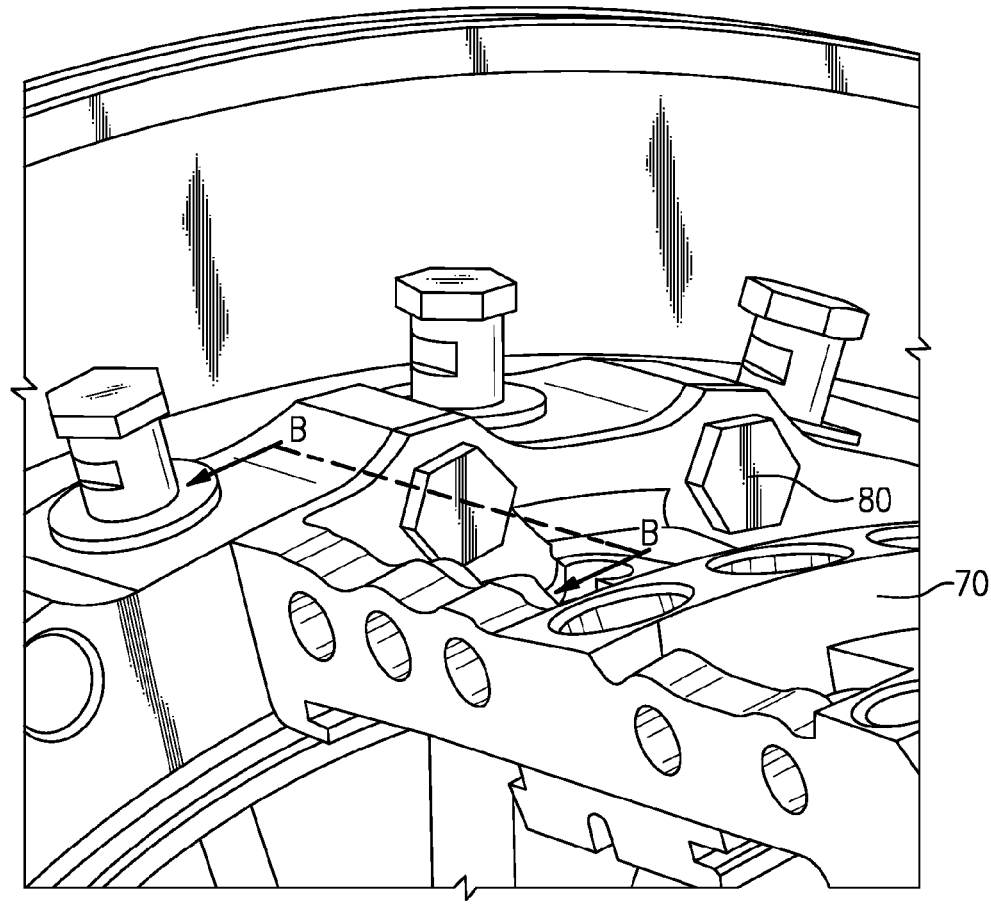
FIG. 4 is a perspective view, corresponding to the arrangement of FIG. 3.

The inlet case 68 is further provided with a plurality of recesses 78 for receiving fasteners 80 for supporting the split case 70, as illustrated in FIG. 4. In one example, the fasteners 80 are bolts, and the recesses 78 are blind openings tapped with threads to cooperate with the threads of the bolts.

Turning back to FIG. 3, the inlet case 68 is provided with at least one passageway for communicating fluid to each of the plurality of inlet guide vanes 66. In one example, the at least one passageway of the inlet case 68 includes a plurality of angled portions 82 that extend between adjacent recesses 78 and openings 72. In this example, the angled portions 82 are provided by machining (e.g., drilling) holes into the inlet case 68 between the openings 72 and the recesses 78. The angled portions 82 could be provided in another manner, however, such as by casting the inlet case 68 integrally with the angled portions 82.

In addition to providing the at least one passageway in the inlet case 68, the stems 74 of each of the vanes 66, in this example, are provided with a perpendicular passageway 84 which substantially spans the opening 72. The perpendicular passageways 84 are in fluid communication with adjacent angled portions 82, and are further in fluid communication with the inlet guide vanes 66. Together, the angled portions 82, the recesses 78, and the perpendicular passageways 84 provide a series of passageways for communicating fluid to the inlet guide vanes 66.

Figure 5:
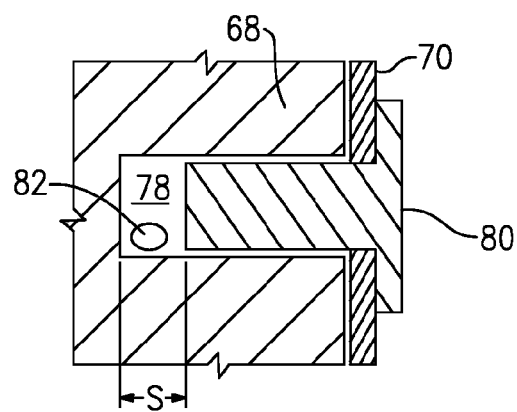
FIG. 5 is a cross-sectional view taken along line B-B from FIG. 4.

In the illustrated example, a supply of fluid 86 is provided into the at least one passageway formed in the inlet case 68. As illustrated, the fluid 86 is directed to a first angled portion 82, toward a perpendicular passageway 84, to a second angled portion 82, through the recess 78, to a third angled portion 82, and so on. The recesses 78 are arranged as illustrated in FIG. 5, in one example, such that a space S is provided between an end of the recess 78 and the end of the fastener 80 to allow fluid to flow through the recess 78.

When passing through each perpendicular portion 84, a portion of the supplied fluid 86 is directed down an axial passageway 76 of a respective inlet guide vane 66. The fluid within the axial passageways 76 serves to prevent ice from forming on the inlet guide vanes 66. The inlet guide vanes 66 may include additional internal passageways for circulating fluid therein. In one example, the fluid circulated within the inlet guide vanes 66 is exhausted into the core flow path of the engine 20.

The supply of anti-ice fluid can be introduced into the series of passageways provided in FIG. 3 at any point, and using any known method. For example, the supply of fluid 86 can be sourced from any desired location in the turbine engine, including a point downstream of the compressor, such as the combustion section, or the turbine section of the gas turbine engine 20. The engine can be provided with a passageway, or a series of passageways, to communicate the fluid upstream to the inlet case 68.

While this disclosure uses the terms "angled" and "perpendicular" relative to the angled portions 82 and the perpendicular passageways 84, these terms are used only to aid in the understanding of this disclosure, and should not be considered limiting. For instance, in an example where the recesses 78 were positioned radially inward, substantially even with the openings 70, the portion of the at least one passageway in the inlet case 68 between the openings 70 and the recesses 78 need not be angled. Further, the perpendicular passageways 84 can be angled, in some examples, and need not be perpendicular to the axes X.

Accordingly, the disclosed embodiments may be used to provide a relatively compact fluid supply to the inlet guide vanes, making use of the existing structure in the engine, and without taking up an undue amount of space by providing the engine with a plenum in communication with each of the inlet guide vanes, as in one prior system.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a plurality of inlet guide vanes; and
   an inlet case supporting each of the plurality of inlet guide vanes, the inlet case being provided with at least one passageway in communication with a source of fluid, the at least one passageway configured to communicate the fluid to each of the plurality of inlet guide vanes, wherein the at least one passageway is configured to communicate fluid to a portion of a first inlet guide vane and to then communicate at least some of the same fluid downstream of the portion of the first inlet guide vane to a second inlet guide vane.

2. The gas turbine engine as recited in claim 1, wherein each of the plurality of inlet guide vanes includes an internal passageway.

3. The gas turbine engine as recited in claim 2, wherein the at least one passageway of the inlet case is configured to communicate the fluid to each of the internal passageways of the plurality of inlet guide vanes.

4. The gas turbine engine as recited in claim 1, including a split case mounted to the inlet case by way of a plurality of fasteners, the inlet case provided with a plurality of recesses for receiving the plurality of fasteners.

5. The gas turbine engine as recited in claim 4, wherein the at least one passageway includes a plurality of angled portions extending from the plurality of recesses to one of the plurality of inlet guide vanes.

6. The gas turbine engine as recited in claim 5, wherein a space is provided between an end of a respective one of the plurality of recesses and a corresponding end of one of the plurality of fasteners such that a fluid can flow through the plurality of recesses.

7. The gas turbine engine as recited in claim 1, wherein each of the plurality of inlet guide vanes includes a vane stem mounted to the inlet case, and wherein each of the plurality of inlet guide vanes includes an axial passageway extending generally perpendicular to an engine central axis.

8. The gas turbine engine as recited in claim 7, wherein each of the plurality of inlet guide vanes includes a perpendicular passageway provided in the vane stem thereof, the perpendicular passageway in fluid communication with the axial passageway and the at least one passageway, the perpendicular passageway extending generally perpendicular to the axial passageway.

9. The gas turbine engine as recited in claim 1, wherein the fluid is an anti-ice fluid.

10. The gas turbine engine as recited in claim 9, wherein the anti-ice fluid is sourced from one of (1) a compressor section of the gas turbine engine, (2) a combustion section of the gas turbine engine, and (3) a turbine section of the gas turbine engine.

11. The gas turbine engine as recited in claim 1, wherein the portion of the first inlet guide vane is a vane stem.

12. The gas turbine engine as recited in claim 11, wherein the at least one passageway includes a first angled portion, a second angled portion, and a perpendicular passageway in fluid communication with the first angled portion and the second angled portion, the perpendicular passageway extending through the vane stem.

13. The gas turbine engine as recited in claim 12, wherein the perpendicular passageway is arranged generally perpendicular to an axis of the first inlet guide vane, the axis of the first inlet guide vane extending generally perpendicular to an engine central axis.

14. The gas turbine engine as recited in claim 12, wherein:
   the gas turbine engine includes a split case mounted to the inlet case by way of a plurality of fasteners, the inlet case provided with a plurality of recesses for receiving the plurality of fasteners; and
   the first and second angled portions extend from respective recesses to the perpendicular passageway.

15. A method for supplying inlet guide vanes with fluid, comprising:
   providing a gas turbine engine including a plurality of inlet guide vanes and an inlet case supporting each of the plurality of inlet guide vanes, the inlet case being provided with at least one passageway; and
   providing a flow of a fluid to the at least one passageway, the at least one passageway communicating the flow of fluid to the plurality of inlet guide vanes, wherein the at least one passageway is configured to communicate fluid to a vane stem of a first inlet guide vane and to then communicate at least some of the same fluid downstream of the vane stem of the first inlet guide vane to a second inlet guide vane.

16. The method as recited in claim 15, wherein each of the plurality of inlet guide vanes includes an internal passageway.

17. The method as recited in claim 16, wherein the flow of fluid is provided to each of the internal passageways of the inlet guide vanes.

18. A method for manufacturing a series of passageways for communicating fluid to inlet guide vanes, comprising:
   machining a plurality of angled passageways into an inlet case between a plurality of openings for receiving a stem of an inlet guide vane and a plurality of recesses for receiving fasteners;
   machining a perpendicular passageway through each of the stems; and
   mounting the inlet guide vanes relative to the inlet case such that the plurality of recesses, the plurality of angled passageways, and the perpendicular passageways are in fluid communication with one another.

19. The method as recited in claim 18, including providing a space at an end of a respective one of the plurality of recesses and a corresponding end of a split case fastener such that a fluid can flow through the plurality of recesses.

20. The method as recited in claim 18, wherein:
   each perpendicular passageway is in fluid communication with an axial passageway within each of the inlet guide vanes; and each perpendicular passageway is arranged generally perpendicular to a respective axial passageway.

* * * * *